United States Patent [19]

Jacobsen et al.

[11] Patent Number: 4,644,786
[45] Date of Patent: Feb. 24, 1987

[54] RAIN GAUGE OF THE TILTABLE SPOON TYPE

[76] Inventors: Hans Jacobsen, Skolevej 2, DK-8670 Laasby; Ole Jacobsen, Egeallé 209, DK-8600 Silkeborg, both of Denmark

[21] Appl. No.: 847,436

[22] Filed: Mar. 31, 1986

Related U.S. Application Data

[63] Continuation of Ser. No. 563,390, Nov. 23, 1983, abandoned.

[30] Foreign Application Priority Data

Mar. 24, 1982 [DK] Denmark ............................. 1570/82

[51] Int. Cl.⁴ .............................................. G01N 1/14
[52] U.S. Cl. ......................................... 73/171; 177/94
[58] Field of Search .............. 73/170 R, 171, DIG. 5, 73/217, 223; 177/94, 110, 115, 24, 102, DIG. 5

[56] References Cited

U.S. PATENT DOCUMENTS

| | | | |
|---|---|---|---|
| 499,223 | 6/1883 | Gorringe | 177/115 |
| 3,236,321 | 2/1966 | Katagiri et al. | 177/110 |
| 3,243,999 | 4/1966 | Barker | 73/171 |
| 3,943,762 | 3/1976 | Baer | 73/171 |

FOREIGN PATENT DOCUMENTS

| | | |
|---|---|---|
| 1227252 | 10/1966 | Fed. Rep. of Germany . |
| 1293570 | 4/1962 | France . |
| 5038 | of 1903 | United Kingdom ................ 177/115 |

Primary Examiner—Charles Frankfort
Assistant Examiner—Patrick R. Scanlon
Attorney, Agent, or Firm—Antonelli, Terry & Wands

[57] ABSTRACT

In a rain gauge of the type comprising a counterbalanced tiltable water collecting spoon system as operating a counter the tiltable spoon system is held in its water collecting position by magnetic attraction forces between a permanent magnet and an armature such that the tilting is initiated in accurate responses to a predetermined overfilling of the spoon system, whereby the tilting takes place in a welldefined and rapid manner conditioning a high measuring accuracy of the rain gauge.

6 Claims, 4 Drawing Figures

RAIN GAUGE OF THE TILTABLE SPOON TYPE

This is a continuation of application Ser. No. 563,390, filed Nov. 23, 1983, now abandoned.

The present invention relates to a rain gauge type specified in the introductory clause of claim 1, connectible to an indoor counter and display unit which includes a water collector tiltable by a predetermined volume of water so as to at least partially empty the collected water and return to the water collection position, with a sensor being operable to produce a series of countable signals in accordance with the intensity of the rain, and with each signal representing, for example, 1 mm of rain.

It has been proposed to provide a rain gauge wherein the water collector is a spoon like element, which is titlably supported about a transverse axis with the spoon element counterbalanced in such a manner that it tilts downwardly when water loaded to the predetermined degree, whereby the water runs off the spoon element and causes the counterweight to tilt the spoon back into its water collecting position. A stationary hopper is arranged above the spoon element for amplifying the water collection, and the tiltable system cooperates with a signal switch in any suitable manner.

For a correct measuring of the rain as required, for example for agricultural purposes, it is important that the tilting movements take place in a very well defined manner in response to both the filling and the emptying of the spoon element, and it is also important that the movements are rather rapid, as the rain will not be effectively collected while the spoon element assumes its unloading position. In a counterbalanced system, however, it is almost impossible to satisfy these operational conditions for an accurate rain gauge for practical use, because the tilting system must be so accurately constructed and adjusted since even the slightest changes due to, for example, thermal displacements would adversely affect the accuracy of the collector.

It has also been proposed to provide a water collector connected with another water collector, with the collectors being arranged as oppositely directed spoon elements which are tiltably supported about a lower transverse axis so as to form a bistable tiltable system. In each of the stable positions thereof one of the water collectors is positioned beneath the lower opening of a hopper, and, when the collector is filled to the predetermined degree, the system will tilt so as to bring the collector into an unloading position and at the same time bring the other collector into the operative position beneath the hopper opening. A system of this kind has the advantage that the consecutive shifts of the water collectors may be effected rather rapidly, if the system is well adjusted, but still a fine and sensible adjustment will be a necessity if the system is to react for abrupt collector shift in response to a very small amount of water bringing the degree of filling up to the said predetermined value. In practice this may be a question of only one drop of water, and the problem again resides in the characteristics of a counterbalanced system.

The aim underlying the present invention essentially resides in providing a rain gauge of the aforementioned type which includes a simple counterbalanced tilting system, but nevertheless exhibits a high accuracy in a reliable manner.

In accordance with advantageous features of the present invention the collector is releasably held in a water collecting position by means of a permanent magnet as effectively cooperating with an armature in a well defined manner so as to be retracted therefrom in response to the collector being filled to said predetermined degree. By the magnetical holding of the tiltable system it is obtained that the overweight as necessary for causing the system to tilt may be both substantial and well defined, i.e. the system will tilt rapidly once the holding force is overcome as provoked by the last increment of water up to the predetermined degree of filling. A magnetic holding action is not subject to wear or changes, i.e. the system may be designed in a robust manner and yet be highly sensible or accurate. The magnetic holding action will be reestablished at the end of the tilting movement, whether in a monostable or a bistable arrangement, i.e. also the last part of the movement will be accelerated.

In the following the invention is described in more detail with reference to the drawing, in which.

Figure 1:
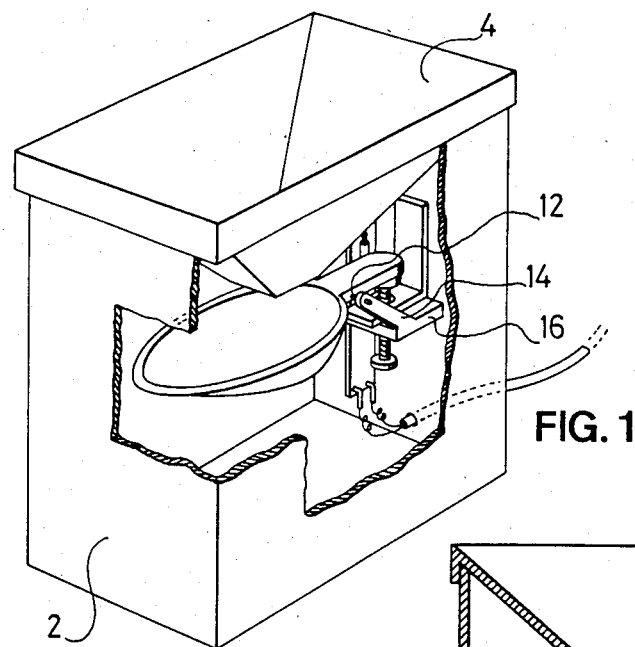
FIG. 1 is a perspective view of a rain gauge according to the invention.
Figure 2:
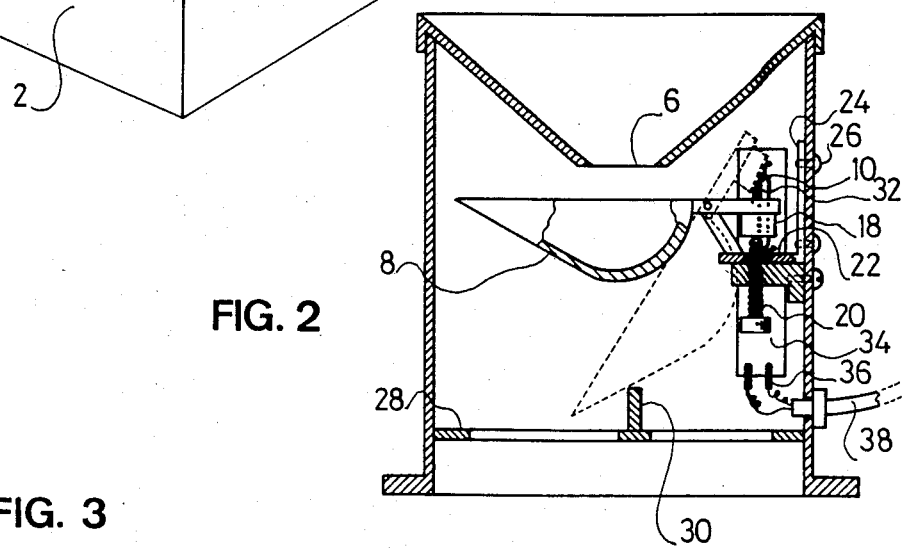
FIG. 2 is a side view thereof.

The rain gauge as shown in FIGS. 1 and 2 comprises an outer housing 2 having a funnel shaped top cover portion 4 defining a lower downlet opening 6 for rain water. Underneath this opening is mounted a spoon element 8 as provided with a shank 10, which has opposed laterally projecting pivot pins 12, by means of which the shank 10 is pivotally supported in bracket arms 14 of a block 16 secured to the housing 2. To the underside of the free end of the shank 10 is secured a permanent magnet 18 acting as a counterweight for the spoon 8 and normally assuming a position of rest as supported by the upper end of an adjustment screw 20 extending through a screw hole in the block 16. On the top side of the block 16 is mounted the horizontal leg 22 of an L-bent iron plate member, the vertical leg 24 of which projects upwardly along the wall of the housing 2, to which it is secured by screws or rivets 26.

A bottom of the housing is provided with a perforated transverse plate portion 28 provided with an upstanding rib 30 serving as an abutment for limiting the downward tilting of the spoon 8 about the pins 12.

Normally the spoon system, according to the present invention will assume a horizontal position with the magnet 18 resting on the screw 20 not only by its resulting overweight relative to the spoon element 8, but additionally by virtue of the magnetic attraction between the magnet 18 and the underlying horizontal leg 22 of the iron L-member 22,24. Preferably the block 16 and the screw 20 are made of non-magnetic material.

As rain water from the hopper 4 is collected in the spoon element 8 the weight or momentum of the spoon will outbalance that of the magnet 18, but the magnetic attraction between the magnet 18 and the horizontal leg 22 still holds the spoon system supported on the screw 20. However, this holding force will be broken when a predetermined weight or overweight of water has been collected in the spoon 8, and once the holding force is broken the spoon will tilt rapidly down because of its overweight and because the magnetic attraction force decreases as soon as the magnet 18 leaves the screw 20.

Thus, the spoon 8 rapidly tilts down to the position shown in dotted lines in FIG. 2, whereby the water flows out of the spoon. Then the spoon system tilts back again by virtue of the higher tilting momentum of the magnet end of the system, and the spoon 8 is now ready to receive another portion of rain water before tilting the next time.

At the end of the return tilting of the spoon system the magnet 18 will get attracted towards the horizontal leg 22, whereby the final phase of the movement will be accelerated. Prior to that, however, the returning magnet will get attracted even towards the vertical leg 24 of the L-member 22,24, whereby the returning speed is further increased; the same attraction, of course, will occur during the downward tilting of the spoon 8, but without correspondingly retarding the tilting because of the overweight of the then water filled spoon.

In practice, with the system described, the duration of a complete tilting cycle may be as low as ca. 0.1–0.3 secs., and the rain gauge may be accurate to within less than 2%. In a practical embodiment the top side of the hopper 4 measures some 50 cm$^2$, and the spoon 8 tilts down at a load of some 5 cm$^2$ water, whereby each tilting corresponds to a rainfall of 1 mm. An accurate 1 mm response is achievable by adjustment of the screw 20 and therewith of the magnetic holding force.

A detection of the tilting operation of the spoon system for transmitting a counting signal to a suitably placed counter may be effected in any of a wide variety of possible manners. However, when a magnet 18 is included in the tiltable system it will be a particularly advantageous possibility to utilize the magnet for operating a magnetic switch, e.g. a so-called Reed-switch, as mounted adjacent the moving path of the magnet. Such a switch, designated 32, is shown as mounted on a vertical plate member 34, which is a print plate secured to one side of the block 16 and is provided with printed connections between the terminals of the switch 32 and a pair of lower terminals 36, these being connected with a cable 38 leading to a suitably placed counter for counting the tilting operations of the spoon system 8,10,18.

Figure 3:
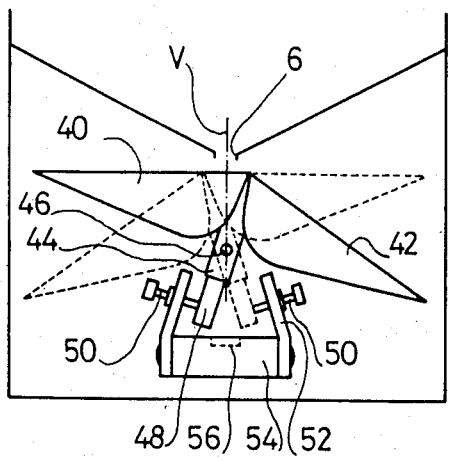
FIG. 3 is a side view of a modified embodiment of the rain gauge.

The tilting system illustrated in FIG. 3 is of the bistable type. It comprises two opposed spoon elements 40 and 42 rigidly mounted on a central carrier lever 44, which is pivoted at 46 to a rigid carrier means not shown. Underneath the pivot 46 the lever 44 is provided with a downwardly projecting permanent magnet 48, which is swingable, together with the lever and spoon system 44,40, 42, between two opposed rigid abutments constituted by the respective ends of non-magnetic adjustment screws 50 as mounted in or through respective opposed iron plate members 52, which are secured to a common carrier member 54 as rigidly associated with the housing of the device.

The pivot 46 is located underneath the center of gravity of the entire tiltable system 40,42,44,48, whereby this system will be bistable between the extreme positions as defined by the magnet 48 abutting the respective opposed adjustment screws 50. In each of these positions the respective spoon 40 or 42 will be located underneath the hopper opening 6, and the spoon will thus be water filled until the center of gravity is hereby caused to be shifted to the other side of the vertical v through the pivot 46 sufficiently to break the magnetic holding force between the magnet 48 and the respective armature plate member 52, whereafter the system will rapidly tilt into its opposite stable position, in which the collected water runs out of the spoon while the opposite spoon starts collecting the water from the hopper opening 6.

Again, a suitable sensor for sensing the tilting movement will be a Reed-switch as shown at 56, which is here embedded in the carrier member 54.

As in FIGS. 1 and 2 it is deemed important that the magnet 48 or 18 does not materially engage the cooperating plate member 52 or horizontal leg 22, but is kept spaced therefrom by means of the respective screws 50 or 20 or similar distance elements, because the force necessary for breaking the magnetic holding force can then be more accurately defined. Additionally, of course, the abutment screws 50 and 20 provide for easy and exact adjustment possibilities.

It will be understood that the invention is in no way limited to the embodiments shown, and, for example, the magnet-plate member-systems may be inverted. It is a general advantage of a rain gauge according to the invention that it will not be extremely sensible as to exact horizontal positioning, because the operation of the tilting system is not solely conditioned by the natural balance thereof. Nevertheless, of course, the rain gauge housing may be provided with adjustable foot screws for facilitating its mounting with correct vertical orientation, i.e. also with correct horizontal orientation of the upper funnel opening.

Figure 4:
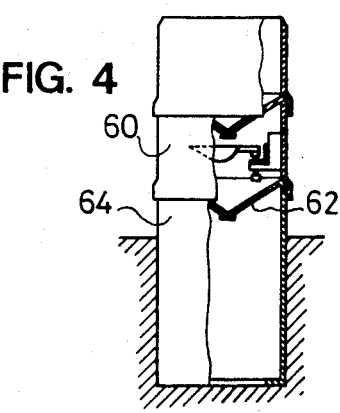
FIG. 4 is an end view of a preferred housing arrangement.

In FIG. 4 is shown a preferred manner of mounting the rain gauge. The spoon system is provided in a housing 60 which has a lower integrated funnel portion 62 and is topwise provided with a similar housing thus defining the downlet hopper to the spoon. The housing 60 is releasably placed on a bottomwise perforated container 64 partly buried in the ground. The lower hopper 62 will thus be usable for guiding the measured rain water to a control measuring glass inside the container, whereby the gauge may be controlled from time to time.

What is claimed is:

1. A rain gauge comprising: a tiltable water collector, said collector being tiltable by a predetermined degree of water filling so as to thereby at least partly empty out water collected therein, said collector being returnable to a water collecting position, sensor means for producing an electrical counting signal in response to the tilting operation of the water collector, a permanent magnet carried by the collector and providing a counter weight, said permanent magnet cooperating with a fixed magnetic attraction member for releasably holding the water collector in the water collecting position, but enabling the water collector to be retracted from the fixed magnetic attraction member and the water collecting position in direct response to the collector being filled to said predetermined degree, means for maintaining a predetermined distance between said fixed magnetic attraction member and said permanent magnet whereby said permanent magnet does not engage the cooperating fixed magnetic attraction member, an adjusting means being provided whereby the spacing between the fixed magnetic attraction member and the permanent magnet in the water collecting position of the tiltable collector is adjustable.

2. A rain gauge according to claim 1, wherein said tiltable water collector is a counterbalanced monostable type wherein the water collector is returned to said water collection position by a counter balance action in direct response to emptying of the tiltable water collector so that said permanent magnet cooperating with said magnetic attraction member provides magnetic attraction forces which add to the counterbalancing of the tiltable water collector along an extended partial angle of the tilting movement of said tiltable water collector adjacent said water collecting position thereof.

3. A rain gauge according to claim 2, wherein the permanent magnet is mounted endwise on said tiltable water collector and said magnetic attraction member is an L-shaped plate member mounted on a rain gauge housing, said plate member including a horizontal leg portion from which the magnet is retractable and a vertical leg portion extending along said extended partial angle of movement of the tiltable water collector and being mounted on the rain gauge housing.

4. A rain gauge according to claim 1, wherein said adjusting means includes a screw made of a non-magnetic material interposed directly between the permanent magnet and the magnetic attraction member in threadable connection with one of the permanent magnet and the magnetic attraction member.

5. A rain gauge according to claim 1, wherein said sensor means includes a switch means for producing a counting signal, and wherein the switch means is mounted adjacent a path of movement of said permanent magnet.

6. A rain gauge according to claim 1, wherein the permanent magnet and the magnetic attraction member are arranged such that by the tilting of the water collector, a space in between the magnet and the magnetic attraction member initially increases in a substantially vertical direction.

* * * * *